No. 682,076. Patented Sept. 3, 1901.
C. T. HINES.
CULTIVATOR.
(Application filed Dec. 27, 1900.)
(No Model.) 7 Sheets—Sheet 2.

Curtis T. Hines, Inventor

Witnesses
Attorney

No. 682,076. Patented Sept. 3, 1901.
C. T. HINES.
CULTIVATOR.
(Application filed Dec. 27, 1900.)

(No Model.) 7 Sheets—Sheet 3.

Curtis T. Hines, Inventor

No. 682,076. Patented Sept. 3, 1901.
C. T. HINES.
CULTIVATOR.
(Application filed Dec. 27, 1900.)

(No Model.) 7 Sheets—Sheet 4.

No. 682,076. Patented Sept. 3, 1901.
C. T. HINES.
CULTIVATOR.
(Application filed Dec. 27, 1900.)

(No Model.) 7 Sheets—Sheet 5.

Witnesses
Jas. K. McCathran
Louis G. Julihn

Curtis T. Hines, Inventor
By E. G. Siggers
Attorney

THE NORRIS PETERS CO., PHOTO-LITHO., WASHINGTON, D. C.

No. 682,076. Patented Sept. 3, 1901.
C. T. HINES.
CULTIVATOR.
(Application filed Dec. 27, 1900.)
(No Model.) 7 Sheets—Sheet 7.

Curtis T. Hines, Inventor

Witnesses

UNITED STATES PATENT OFFICE.

CURTIS TRUBERRY HINES, OF WEST MONROE, LOUISIANA.

CULTIVATOR.

SPECIFICATION forming part of Letters Patent No. 682,076, dated September 3, 1901.

Application filed December 27, 1900. Serial No. 41,262. (No model.)

*To all whom it may concern:*

Be it known that I, CURTIS TRUBERRY HINES, a citizen of the United States, residing at West Monroe, in the parish of Ouachita and State of Louisiana, have invented a new and useful Cultivator, of which the following is a specification.

This invention relates to a novel cultivator or harrow, and has for its object the production of a device of this character embodying a sectional frame and several series or gangs of plow-beams, which enable the device to be readily converted for various classes of work by modifying and rearranging the frame structure through the adjustment of the sections and by incorporating or eliminating certain of the gangs of plow-beams.

The cultivator or harrow constructed in accordance with the invention is capable of ready conversion to adapt it for a large number of uses—as, for instance, bedding, ridging, fallow-breaking, turning under the seed, as by harrowing or plowing, and the cultivation of all kinds of crops, whether the plants are small and close together or of a size sufficient to extend higher than the axle—and to enable the machine to be thus converted it is constructed in the manner to be described, illustrated in the accompanying drawings, and defined in the appended claims.

In said drawings.

Inasmuch as the device is essentially a convertible agricultural machine, I shall describe the construction by reference to the figures of the drawings in groups, each of which embodies a different construction, but includes many features common to the structure illustrated in the others.

Referring, therefore, more particularly to Figs. 1, 2, 3, 9, and 10, 1 and 2 indicate a pair of carrying-wheels mounted upon the outer ends of short axle sections or ends 3 and 4. These short axles are separated, as shown more clearly in Fig. 3, by a considerable intervening space, and to their adjacent ends are adjustably connected the rear posts 5 and 6 of the machine-frame. This frame, in addition to the rear posts, comprehends a pair of front posts 7 and 8, connected at their upper ends to the rear posts by longitudinal beams 9 and 10, the front posts 7 and 8 being supported by the inner ends of a pair of laterally-extending horizontal beams 11 and 12, supported at their outer ends by vertical frames 13 and 14, at the lower ends of which are swiveled a pair of caster-wheels 15, designed to travel immediately in advance of and in line with the carrying-wheels 1 and 2.

It will be observed that the laterally-extending supporting-beams 11 and 12 are disposed parallel with the axles, but in a somewhat lower plane and at an advanced point. In order to maintain this relation of these parts, I provide diagonal or inclined braces 16, arranged in pairs, as shown, one pair serving to connect and brace the beam 12 and axle 4 and the other pair serving in similar manner between the beam 11 and the axle 3. The inner inclined braces are preferably secured also to the posts 7 and 8 at the front of the frame and are adjustably connected to the posts 5 and 6 at the rear end thereof. For the purpose of adding additional strength to the frame I preferably employ front corner-standards 17 and 18, bolted to the beams 11 and 12 and to the outer diagonal braces 16, the upper ends of these standards being connected by the adjacent posts of the frame by means of short transverse brace-bars 19 and 20 and to the outer ends of the axles by longitudinal brace-bars 21 and 22, the bolts connecting these parts being readily removable in order to facilitate their detachment when it is desired to convert the machine for various uses in a manner to be hereinafter made apparent.

At the rear end of the frame—that is to say, to the axles 3 and 4, adjacent to their outer ends—are adjustably secured what may be termed "rear" corner-standards 23 and 24, located directly behind the front corner-standards 17 and 18 and preferably bolted to the rear ends of the outer inclined braces 16 and to the longitudinal braces 21 and 22. Extending entirely across this main frame, at the rear end thereof and immediately above the frame-beams 9 and 10 and the longitudinal braces 21 and 22, is the main transverse beam 25 of the machine-frame, bolted to the posts 5 and 6 and standards 23 and 24 and designed to support the rear end of the tongue or pole 26, which carries the driver's seat 27 and is bolted to the cross-beam 27$^a$ of a vertically-adjustable arch located at the front end of the frame and comprising the beam 27$^a$ and a pair of arch-posts 28 and 29. The side posts of the arch are disposed against the rear faces of the posts 7 and 8 and are adjustably secured thereto, as by bolts 30, designed to engage any one of a series of openings 31 in the arch-posts.

We now have the frame complete with the exception of the front and rear transverse stop-beams 32 and 33, located at the front and rear of the frame and designed to limit the depression of the plow-beams, to be described, the stop-beam 32 being comparatively short and extending between the lower ends of the front posts 7 and 8, to which it is bolted, and the rear stop-beam being of somewhat greater length and bolted to the lower ends of the rear posts 5 and 6 and standards 23 and 24. It is evident that a frame constructed like that described will possess great strength in view of the peculiar relation of the beams and braces and will at the same time be of very light weight to reduce to a minimum the load imposed upon the draft-animals, for the attachment of which the supporting-beams 11 and 12 are provided with singletrees, or, if desired, a doubletree may be attached to the front stop-beam 32 in such forms of the machine as do not require the elimination of that member. The application of the draft appliances may, however, be effected in any desired manner and may be of such form as is demanded by the character of work to be done and the number of draft-animals to be employed.

The completion of the description of the machine-frame proper brings us now to the consideration of the manner in which the plow-beams are supported and the means employed for permitting their automatic individual adjustment when opposed by a rock or other unyielding obstacle and the mechanism by means of which all of the beams may be elevated and depressed by the driver without disturbing that relation of the plows which is necessary for their most effective operation. The several plow-beams 34 are disposed longitudinally in substantially equidistant relation and are mounted in gangs, two of which I shall denominate as "side" gangs 35 and 36 and the other as the "center" gang 37. These designations are adopted for the reason that the beams composing the side gangs are pivotally connected to the supporting-beams 11 and 12 of the frame at opposite sides of the center structure thereof—that is to say, outside of or beyond the posts 7 and 8—while the beams composing the center gang are disposed intermediate of the side gangs and are located intermediate of the frame-posts, as shown. The manner of connecting the front ends of the beams comprising the side frames is not essential; but as the rear ends of said beams are designed to be raised or lowered I preferably provide their front ends with metal strips 38, encircling the beams 11 and 12, as clearly illustrated in Fig. 1. On the contrary, the front ends of the center gang are not permanently connected to any part of the machine-frame proper, but are adjustably supported by a beam-connecting rod 39, passed transversely through the several beams of the center gang at their front ends. The side beams 40 and 41 of the center gang abut against a head on one end and a nut on the other end of the connecting-rod 39 to prevent their lateral separation; but the front ends of the middle beams 42 are designed to have more or less lateral movement, and for this reason they are loosely mounted upon the rod, which latter is encircled by spiral springs 43, located intermediate of the several beams and designed to yieldingly retain the beams 42 in their normal positions equidistant from each other and from the other beams of the series.

Figure 6:
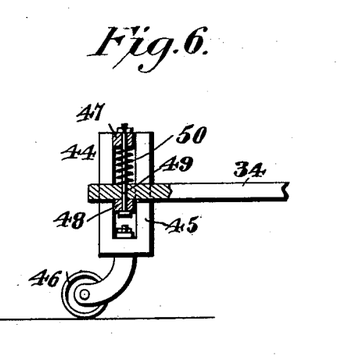
Fig. 6 is a detail sectional elevation illustrating the manner of mounting the rear end of the beams in the beam-carriage.

We have now seen the manner in which the front ends of all the plow-beams are supported, and it is evident that provision must be made for supporting their rear ends in a manner to permit their simultaneous elevation or depression and to accommodate the lateral movement of which the two middle beams are capable. This rear-end-supporting device I shall term a "beam-supporting" carriage 44, supported at its opposite ends by vertical frames 45, having caster-wheels 46, similar to the wheels 15 at the front of the frame and likewise alined with the carrying-wheels 1 and 2, so that the carrying-wheels and the several caster-wheels, which are designed to steady the frame, will track one with the other. The beam-carriage 44 is disposed transversely immediately behind the carrying-wheels and is composed of upper and lower parallel beams 47 and 48, retained in spaced relation in any suitable manner and carrying a series of vertically-disposed guide-rods 49 in substantially equidistant relation and piercing the rear ends of the plow-beams, as clearly shown in Fig. 6, in order to permit said beams to rest upon the lower beam 48 of the carriage and to have more or less vertical movement upon the guide-rods. This vertical movement of the beams is obviously designed to permit them to yield upwardly under certain conditions; but this upward movement is opposed—as, for instance, by spiral springs 50, encircling the rods 49 and bearing at their opposite ends upon the beams and against the under side of the carriage-beam 47. The plow-standards 51 are pivotally connected to the beams at different distances from the ends of the latter in order to dispose the plows 52 in the usual wedge-shaped or graduated order—that is to say, the plows at opposite sides of the frame-center are disposed in advancing order, beginning with the plows carried by the outside beams—and in the present device this order of advance is so regulated as to bring the plows carried by the center gang of beams in front of the axle, so that when eight plows are employed, as in the present case, four will be located behind the axle and the other four in front thereof for the purpose of equalizing the strain upon the frame. The standards 51 are capable of adjustment upon the beams by reason of the provision of a series of bolt-holes in each standard for the reception of the bolt 53, which effects its connection, and in addition to the yieldable mounting of the plow-beams, opposed, as before stated, by the the springs 54, the plow-standards themselves are mounted to yield against the resistance of standard-springs 54, secured at one end to the standard below its connection and at the opposite end to the plow-beam in advance of the standard.

Figure 1:
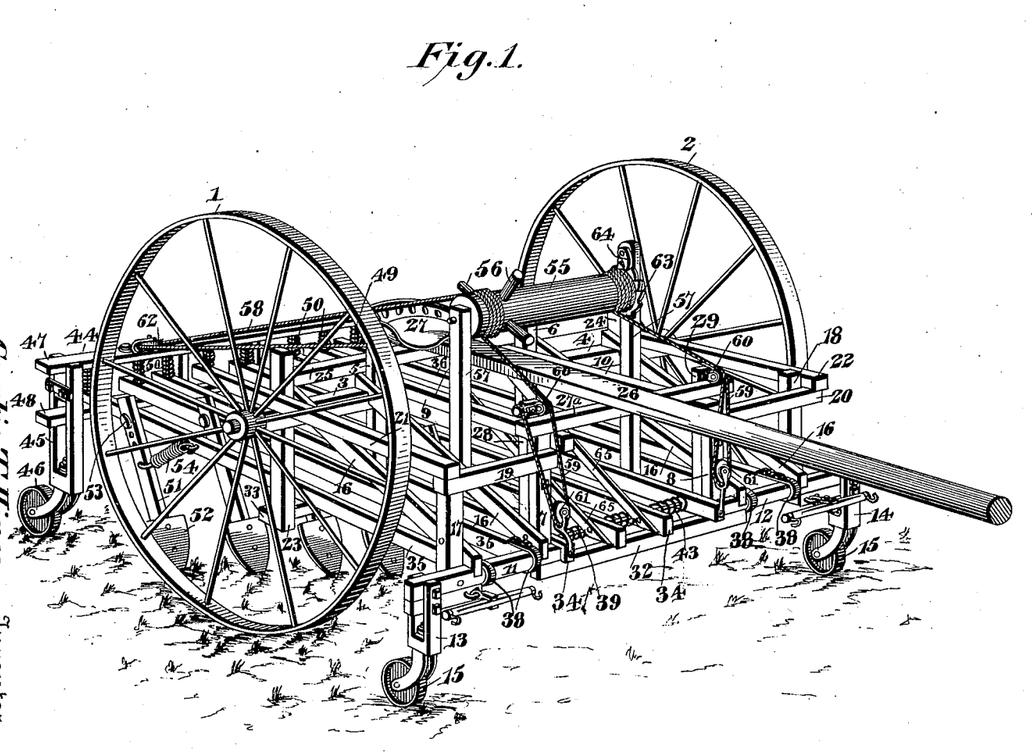
Figure 1 is a perspective view of my machine complete.
Figure 2:
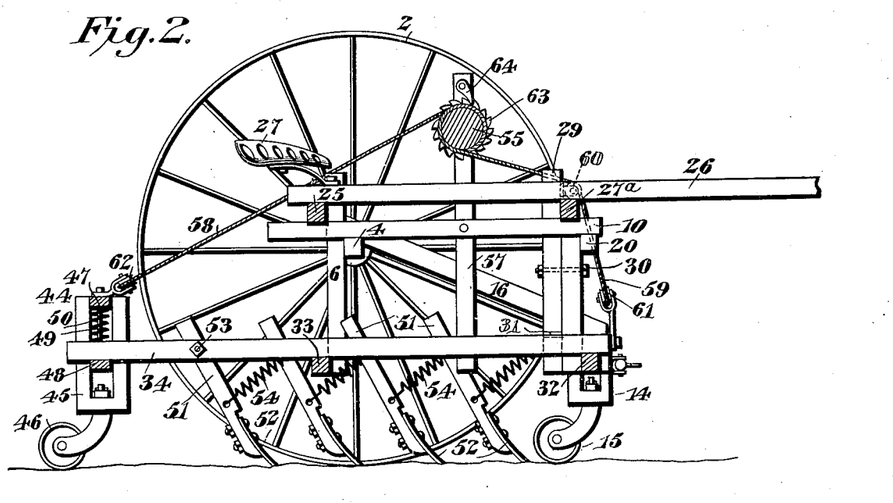
Fig. 2 is a central longitudinal section through the subject-matter of Fig. 1.
Figure 3:
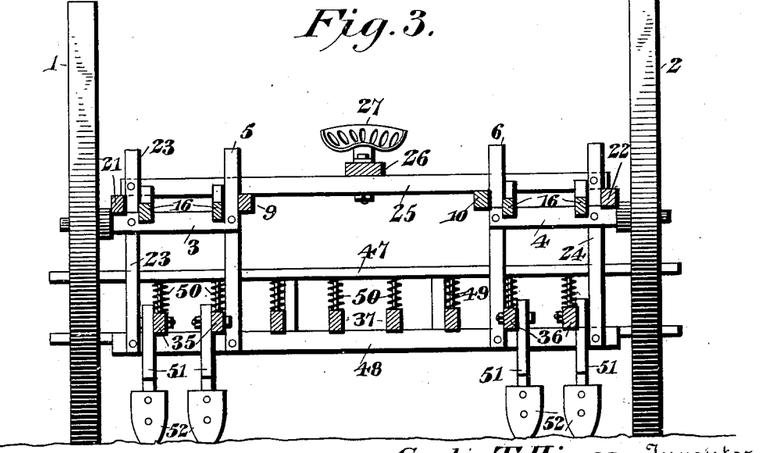
Fig. 3 is a transverse sectional view thereof.
Figure 4:
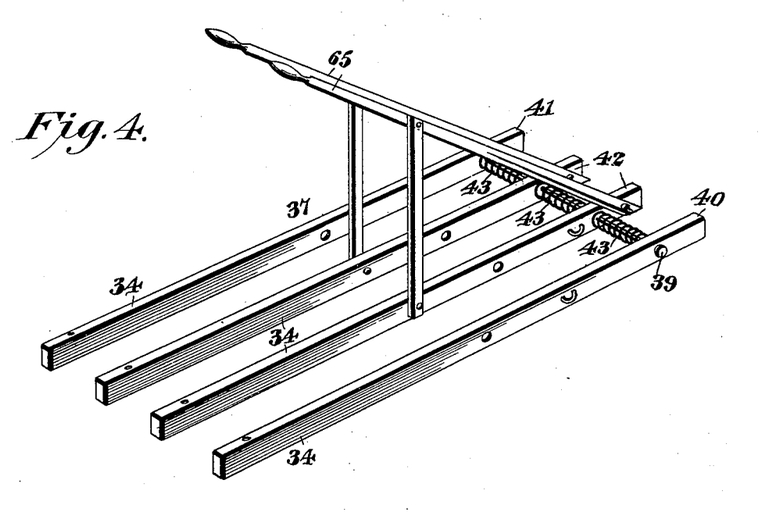
Fig. 4 is a perspective view of the center gang of plow-beams detached.
Figure 5:
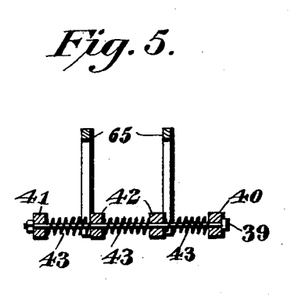
Fig. 5 is a detail sectional view illustrating the mounting of the front ends of the plow-beams shown in Fig. 4.

We have now seen the manner in which the frame is constructed, how the plow-beams are supported at their opposite ends, and how provision is made for the yielding of the standards and beams to prevent breakage of the parts when one or more of the plows encounter a rigid obstruction, and it therefore remains to be seen by what mechanism the driver or operator is enabled to elevate or depress the plows at will for the purpose of accommodating them to the character of the ground being worked or to raise them out of contact with the ground to facilitate the transportation of the machine from one point of use to another. This end may be effected in a variety of ways; but a simple and highly-efficient device for this purpose comprehends a cable-drum 55, located above the frame and provided with a series of radial handles 56 in convenient reach of the driver. The drum is preferably journaled between the upper ends of a pair of uprights 57, bolted to the fixed parts of the frame—as, for instance, to the inner inclined braces 16. Around this drum 55 are wound in opposite directions two pairs of cables 58 and 59, the cables 58 passing over guide-pulleys 60, mounted at the upper ends of the arch-posts 29, thence around pulley-blocks 61 at the front end of the center gang of plow-beams, and are terminally secured—as, for instance, to the upper ends of the posts 28 and 29, as shown in Fig. 1. The other pairs of the cables 58 pass from the drum 55 around pulley-blocks 62 upon the beam-carriage and are terminally secured to the rear frame-posts 5 and 6. To prevent the backward rotation of the drum, it is provided at one end with a ratchet-wheel 63, engaged by a pawl 64, pivoted upon one of the uprights. The effect of this arrangement of the beam-adjusting mechanism is that when the drum is rotated both pairs of cables will be wound thereon to elevate the beam-carriage 44 and with it the rear ends of all of the beams, and, furthermore, to elevate the front ends of the beams composing the center gang. This latter feature is possessed of special utility for the reason that all of the plows will thus be elevated in the same degree. This will be made plainer when it is remembered that the foremost plows are carried by the beams of the center gang and are disposed in front of the axle. It will be evident, therefore, that if the rear ends only of the beams were elevated the plows carried by the side gangs would be raised much higher than those carried by the center gang, and it is for the purpose of equalizing this difference of position and of securing practically the same degree of adjustment of all of the plows that provision is made for elevating the front ends of the center gang. This is not only very desirable when raising the plows out of contact with the ground to facilitate the transportation of the machine, but also insures such relation of the plows when they are adjusted as will maintain them in relative positions most conducive to their coöperation.

It has been stated that the two middle beams of the center gang are designed to be moved laterally. This provision is made in order that the two foremost plows may be shifted slightly toward or from each other for the purpose of cultivating closely around the roots of such plants as may require this sort of cultivation. The lateral adjustment of these middle beams is effected by the driver through the medium of a pair of beam-adjusting levers or handles 65, suitably connected to the front ends of the middle beams 42 and extended upwardly and rearwardly into convenient reach from the driver's seat.

The operation and mode of manipulation of this, the most comprehensive form of the machine, is as follows: The draft-animals will draw the machine over the ground and the caster-wheels at the sides of the frame will track with the carrying-wheels to reduce the draft and will cause the device to move steadily and without any tendency to vibrate or swing laterally. The plows, which may be of any desired form, but which are preferably small and light, will enter the ground and upon striking a stone or rod will yield against the resistance opposed by the standard-springs 54 to prevent breakage. If this yielding of the plows by the swinging of their standards is not sufficient to overcome the obstacle, the plow-beam will be elevated against the resistance of the spring 50 to permit the plow to pass over the obstruction without injury. If now it is desired to cultivate close to a row of plants, the center plows may be shifted slightly either toward or from each other by means of the individual beam-handles 65, and if it is desired to regulate the depth of the furrows the plows may be slightly elevated or depressed by the rotation of the drum, which, in the manner specified, will elevate the rear ends of all of the plow-beams simultaneously and will also elevate the front ends of the center gang to secure a practically identical adjustment of all of the plows. Finally, if it is desired to raise the plows entirely out of contact with the ground in order to transport the machine from one field to another this may be readily accomplished by a further manipulation of the cable-drum in an obvious manner.

Figure 7:
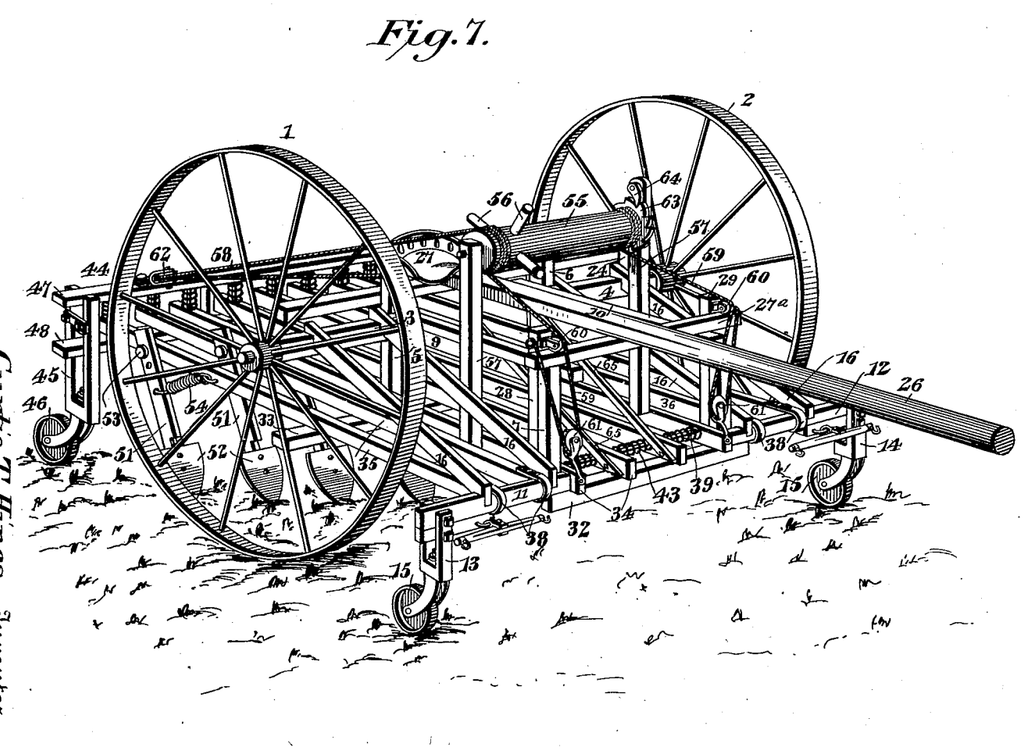
Fig. 7 is a view similar to Fig. 1, but showing the machine converted or modified for very light work.
Figure 8:
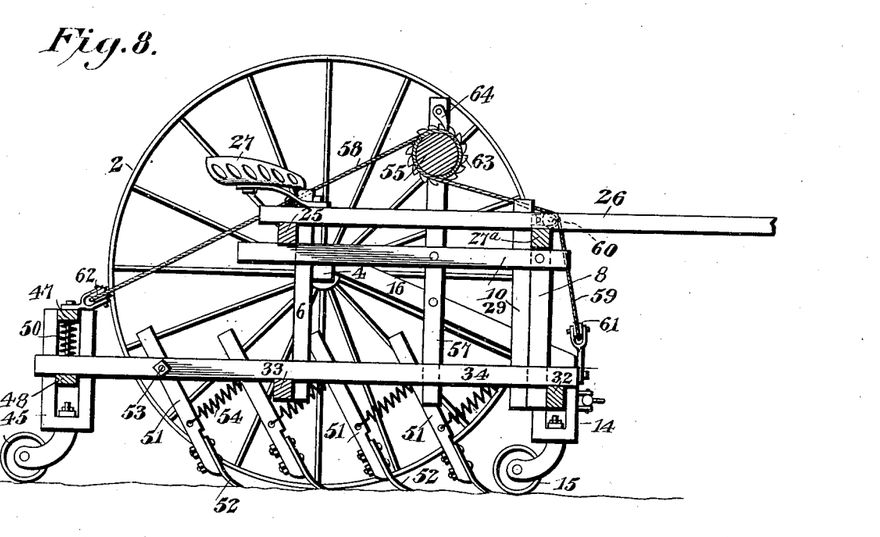
Figs. 8 and 9 are longitudinal and transverse sections, respectively, of the subject-matter of Fig. 7.
Figure 9:
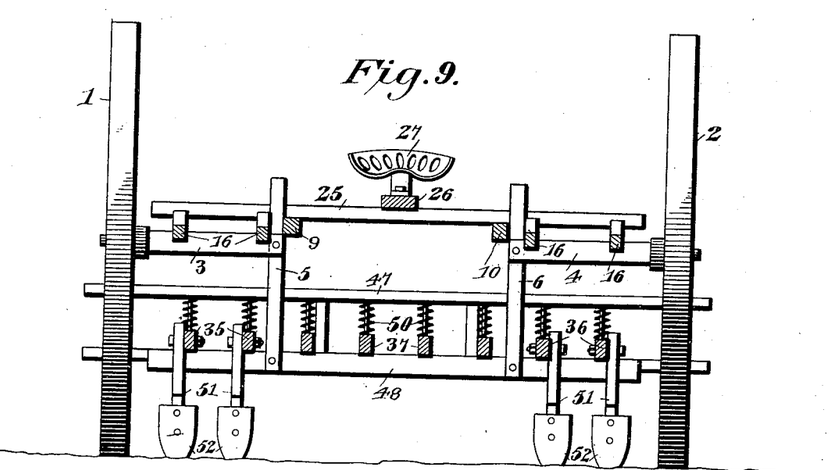

In Figs. 7, 8, and 9 I have illustrated my device converted for light work when it is particularly desirable to reduce the weight of the frame to a minimum and where the strain imposed is not sufficient to necessitate a frame so thoroughly braced as that illustrated in the first three figures of the drawings. In order to convert the device for such use, the front and rear corner-standards 17, 18, 23, and 24, the short front braces 19 and 20, and the longitudinal braces 21 and 22 are removed, thereby materially lightening the frame, which is fully adequate for light work by reason of the fact that the maintenance of the axles and front supporting-beams in their proper positions is effected by the inclined braces 16.

Figure 10:
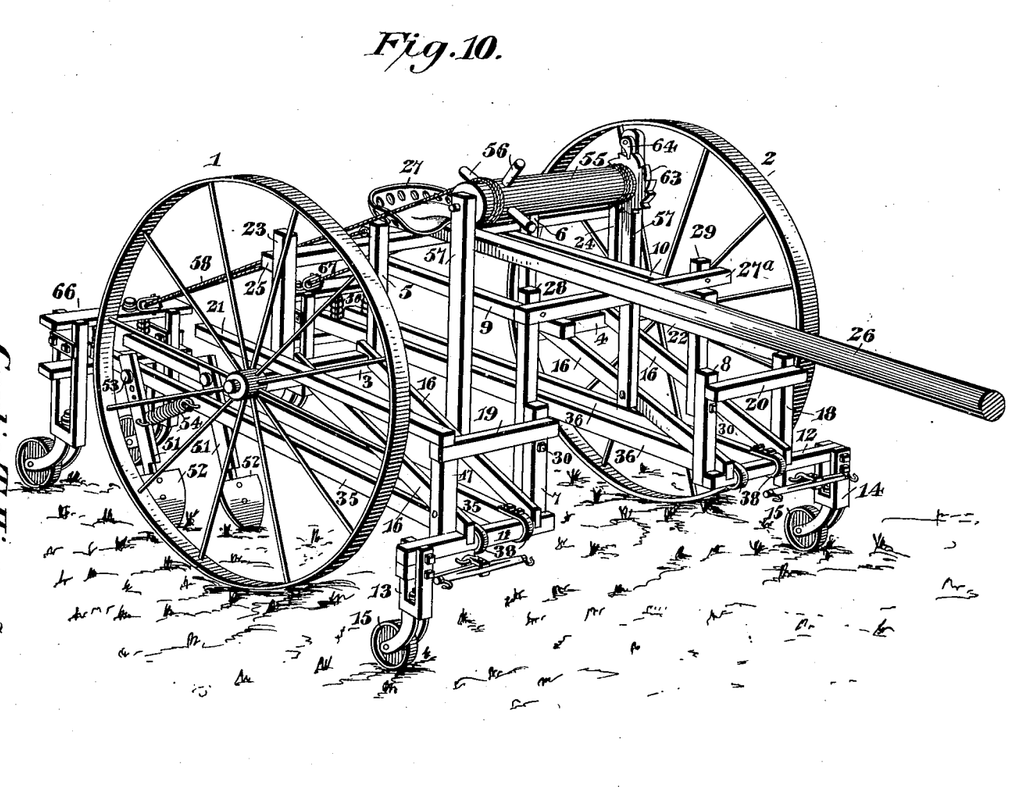
Fig. 10 is a perspective view of the machine converted for use as a straddle-row cultivator, the central superstructure being shown in its elevated position.
Figure 11:
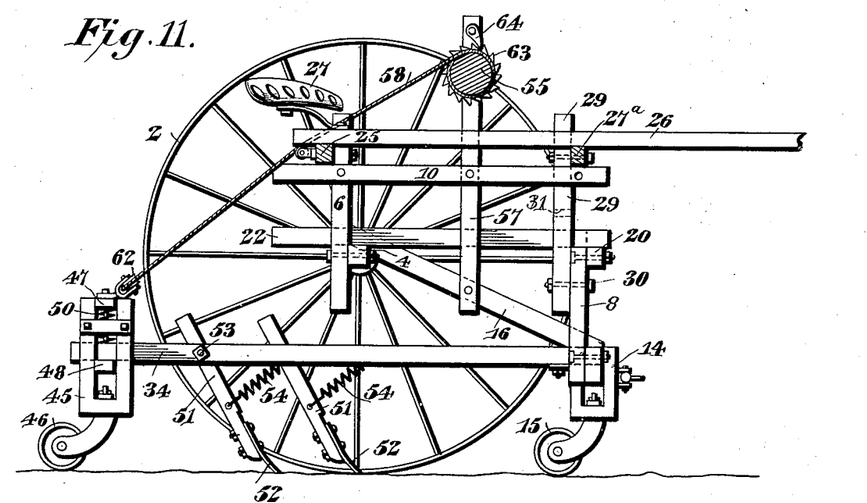
Figs. 11 and 12 are longitudinal and transverse sectional views, respectively, of the subject-matter of Fig. 10.
Figure 12:
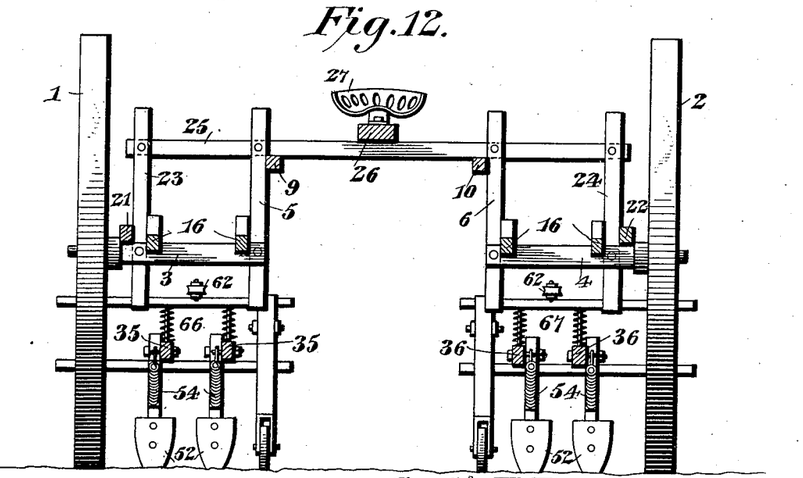

In Figs. 10, 11, and 12 I have illustrated my machine converted as a straddle-row cultivator or harrow for the cultivation of tall plants—as, for instance, for last plowing. To effect this conversion of the machine organized as illustrated in Fig. 1, the long beam-carriage at the rear of the machine is removed, the center gang of beams is entirely detached and likewise removed, and also the stop-beam 32 at the front of the frame. The beam-carriage is then replaced by a pair of short side gang beam-carriages 66 and 67, each of which is constructed like the carriage 44, except, of course, it is much shorter and supports only the rear ends of the side gang. As the center gang of beams and plows is eliminated in this form, the cables 59 are dispensed with and the cables 58 are operatively connected to the carriages 66 and 67 in a manner similar to their operative connection with the carriage 44, as already fully described. Finally, the rear stop-beam 33 is detached from the rear posts and standards, and the resulting structure will be a frame divided and unobstructed at its center and having at either side a gang of plows designed to cultivate along the opposite sides of a row of tall plants. The height of the clearance at the center of the machine organized in this manner is determined by the positions of the cross bar or beam 27 of the front arch and the main transverse beam at the rear of the frame. It sometimes happens that the normal positions of these members shown in Fig. 1 are not sufficiently elevated to permit the use of the machine for last plowing or for the cultivation of exceedingly-tall plants. It is for this reason that I have described the front arch as being vertically adjustable and have made provision for the vertical adjustment of the rear posts 5 and 6 and the rear standards 23 and 24. Supposing now that a contingency has arisen requiring the further elevation of the superstructure at the center of the frame, the bolts securing the side posts 28 and 29 of the front arch and those securing the rear posts and standards 5 and 6 and 23 and 24 are removed. The arch and rear beam 25 are then raised to the desired height and are resecured in their elevated positions by the replacement of the bolts. The result of this conversion will be the structure shown in Figs. 10, 11, and 12, wherein it will be noted that the clearance or straddle at the center of the machine is of great height, and at the same time the frame, while being very light, is possessed of great rigidity, so that the machine may be driven directly over a row of exceptionally tall plants to cause the plows at either side of the frame to effectually cultivate the ground adjacent to the opposite sides of the plants.

From the foregoing it will appear that I have produced an agricultural machine of comparatively light durable construction designed to be quickly and conveniently converted for use in a large variety of agricultural connections; but while the present embodiment of the invention appears at this time to be preferable I wish to be distinctly understood as reserving to myself the right to effect such changes, modifications, and variations as may be hereafter suggested by experience and experiment, provided such variations from the illustrated structure are embraced within the scope of the protection prayed.

What I claim is—

1. In an agricultural implement, the combination with carrying-wheels and a frame extending forwardly from said wheels, of a series of plow-beams supported at their front ends by the front end of the frame, and a beam-carriage supporting the beams at a point behind the frame, said beam-carriage being independent of the frame.

2. In an agricultural implement, the combination with a frame and carrying-wheels supporting the frame, of a plurality of plow-beams pivotally supported at one end by the frame, and a separate wheeled beam-carriage independent of the frame and supporting the other ends of the beams, the wheels of said carriage being disposed to track with the carrying-wheels.

3. In an agricultural implement, the combination with a frame, carrying-wheels supporting the rear end of the frame and caster-wheels supporting the front end thereof, of a series of plow-beams supported at their front ends by the forward end of the frame, and a wheeled beam-carriage separate from the frame and located behind the carrying-wheels and supporting the rear ends of the beams, the wheels of the carriage and the caster-wheels of the frame being disposed to track with the carrying-wheels.

4. In an agricultural implement, the combination with the frame and carrying-wheels therefor, of a series of plow-beams extending rearwardly from the frame, a separate wheeled beam-carriage supporting the rear ends of the beams and permitting limited independent movement thereof within the carriage, and means for raising and lowering the carriage, said beam-carriage being separate from and independent of the frame.

5. In an agricultural implement, the combination with a frame comprising side portions in laterally-spaced relation, a superstructure connecting the side portions, and carrying-wheels at opposite sides of the frame, of a gang of plow-beams carried by each side portion of the frame, a separate independent wheeled carriage supporting the rear ends of the plow-beams, and means for raising and lowering the carriage independently of the frame.

6. In an agricultural implement, the combination with a frame comprising depressed side portions in laterally-spaced relation, an intermediate superstructure located in a plane above the side portions and carrying-wheels for the frame, of means for securing the superstructure of the frame at different heights, plow-beams supported at their front ends by the frame, and means for raising and lowering the rear ends of said beams.

7. In an agricultural implement, the combination with a frame comprising side portions in laterally-spaced relation, a superstructure connecting said side portions, said superstructure comprising a vertically-adjustable arch at the front of the frame, vertically-adjustable posts at the rear end of the frame, and a main transversely-disposed frame-beam carried by said posts, side gangs of plow-beams mounted in the side portions of the frame, a center gang of plow-beams removably mounted intermediate of said side portions of the frame, and means for supporting the rear ends of the several plow-beams.

8. In an agricultural implement, the combination with a frame comprising side portions in laterally-spaced relation, a superstructure connecting said side portions, said superstructure comprising a vertically-adjustable arch at the front of the frame, vertically-adjustable posts at the rear end of the frame, and a main transversely-disposed frame-beam carried by said posts, side gangs of plow-beams mounted in the side portions of the frame, a center gang of plow-beams removably mounted intermediate of said side portions of the frame, removable stop-beams located at the opposite ends of the frame for limiting the depression of the plow-beams, and means for effecting the simultaneous elevation of the several beams.

9. In an agricultural implement, the combination with a frame and carrying-wheels, of plow-beams carried by the frame and arranged in side gangs and an intermediate center gang, and means for raising and lowering the rear ends of all of the plow-beams and the front ends of the center gang.

10. In an agricultural implement, the combination with a frame and carrying-wheels, of side gangs of plow-beams pivotally mounted at their front ends, a center gang of plow-beams intermediate of the side gangs, beams for raising or lowering the rear ends of all of the plow-beams, and means for raising and lowering the front ends of the center gang of beams when their rear ends are similarly adjusted, whereby the advanced plows carried by the center gang will be adjusted in a degree substantially corresponding to the adjustment of the less advanced plows carried by the side gangs.

11. In an agricultural implement, the combination with a frame and carrying-wheels, of side gangs of plow-beams pivotally mounted at their front ends, a center gang of plow-beams disposed intermediate of the side gangs, a wheeled carriage supporting the rear ends of all of the beams, a drum mounted on the frame, and cables wound upon the drum and connected to the carriage and to the front end of the center gang of beams to effect the elevation or depression of the beams in a manner to secure the substantially corresponding adjustment of all of the plows.

12. In an agricultural implement, the combination with a frame comprising laterally-spaced side portions and an intermediate superstructure, of a short axle constituting a part of each side portion of the frame, a carrying-wheel supporting each axle, a caster-wheel disposed immediately in advance of each carrying-wheel and supporting the front end of the frame, side gangs of plow-beams mounted in each side of the frame and a movable center gang of plow-beams disposed between the side portions of the frame, a wheeled carriage supporting the rear ends of all of the beams and having caster-wheels disposed directly behind the carrying-wheels, and means for raising and lowering said carriage.

13. In an agricultural implement, the combination with a frame comprising laterally-spaced side portions and an intermediate superstructure, of a short axle constituting a part of each side portion of the frame, a carrying-wheel supporting each axle, a caster-wheel disposed immediately in advance of each carrying-wheel and supporting the front end of the frame, side gangs of plow-beams mounted in each side of the frame and a movable center gang of plow-beams disposed between the side portions of the frame, a wheeled carriage supporting the rear ends of all of the beams and having caster-wheels disposed directly behind the carrying-wheels, means for raising and lowering said carriage, and a removable stop-beam located at the rear end of the frame and designed to limit the depression of the plow-beams.

14. In an agricultural implement, the combination with a frame comprising laterally-spaced side portions each composed of front and rear posts, a longitudinal beam connecting said posts, a short axle extending laterally from the rear post, a short supporting-beam extending laterally from the front post, inclined braces connecting the axle and supporting-beam, a vertically-adjustable arch connecting the front posts of the side portions, and a main frame-beam connecting the rear posts of the side portions, of carrying-wheels mounted on the axles, caster-wheels supporting the short supporting-beams at the front of the frame, and a series of plow-beams mounted in the frame.

15. In an agricultural implement, the combination with a frame comprising laterally-spaced side portions each composed of front and rear posts, a longitudinal beam connecting said posts, a short axle extending laterally from the rear post, a short supporting-beam extending laterally from the front post, inclined braces connecting the axle and supporting-beam, front and rear standards secured to the axle and supporting-beam, longitudinal and transverse braces connecting the front and rear standards and connecting the front standard with the adjacent front post, a vertically-adjustable arch connecting the front posts of the side portions, and a main beam connecting the rear posts of the side portions, of carrying-wheels mounted on the axles, caster-wheels supporting the short supporting-beams at the front of the frame, and a series of plow-beams mounted in the frame.

16. In an agricultural implement, the combination with a frame comprising laterally-spaced side portions each composed of front and rear posts, a longitudinal beam connecting said posts, a short axle extending laterally from the rear post, a short supporting-beam extending laterally from the front post, inclined braces connecting the axle and supporting-beam, front and rear standards secured to the axle and supporting-beam, longitudinal and transverse braces connecting the front and rear standards and connecting the front standard with the adjacent front post, a vertically-adjustable arch connecting the front posts of the side portions, and a main beam connecting the rear posts of the side portions, of carrying-wheels mounted on the axles, caster-wheels supporting the short supporting-beams at the front of the frame, a series of plow-beams mounted in the frame, a stop-beam located below the plow-beams and secured to the rear posts and standards, and a second stop-beam secured at its opposite ends to the lower ends of the front posts of the frame.

17. In a convertible agricultural implement, the combination with a frame comprising laterally-spaced side portions, an intermediate vertically-adjustable superstructure, and a vehicle-tongue and driver's seat supported by said superstructure, of carrying-wheels supporting the frame, side gangs of plow-beams supported by the side portions of the frame, a removable center gang of plow-beams located intermediate of the side portions of the frame, and means disposed adjacent to the driver's seat for effecting the adjustment of the several plow-beams.

18. In an agricultural implement, the combination with a frame, of a series of plow-beams, a drum mounted above the frame, cables wound upon the drum and connected to the fixed part of the frame, said cables having running connection with the opposite ends of the plow-beams to effect the simultaneous elevation or depression of both ends of the plow-beams, as desired.

19. In an agricultural implement, the combination with a frame, of plow-beams pivotally supported at their rear ends and capable of lateral movement in a horizontal plane, means for yieldingly retaining said beams in their normal positions, and means disposed at the front ends of the beams for moving them laterally to bring the plows close to the roots of the plants being cultivated.

20. In an agricultural implement, the combination with a frame, of plow-beams pivotally supported at their rear ends for lateral movement in a horizontal plane, means for yieldingly retaining the beams in their normal positions against lateral movement, means for urging the beams laterally to present the plows closer to the plants being cultivated, and means for effecting the vertical adjustment of the plow-beams.

21. In an agricultural implement, the combination with a frame, of plow-beams mounted at their front ends for lateral movement in a horizontal plane, means for imparting such movement to the plow-beams at their front ends, a carriage supporting the rear ends of the beams, and means for raising and lowering the carriage.

22. In an agricultural implement, the combination with a frame, of a series of plow-beams mounted therein, a carriage supporting the rear ends of said beams in a manner to permit the vertical movement of said beams within the carriage, and springs resisting such movement of the beams to hold them in their depressed positions.

23. In an agricultural implement, the combination with a frame and plow-beams, of a wheeled carriage, guide-rods supported by the carriage and piercing the beams, and springs surrounding said guide-rods and opposing upward movement of the beams within the carriage.

24. In an agricultural implement, the combination with a frame and plow-beams, of a wheeled carriage common to the several plow-beams, means for yieldingly supporting the beams in the carriage, and a plow-standard carried by the beams and movable independently thereof.

25. In an agricultural implement, the combination with a frame and plow-beams provided with pivoted plow-standards, of a wheeled carriage supporting the rear ends of the beams, of springs resisting the movement of the beams within the carriage, and other springs resisting the yielding of the plow-standards with respect to the beams.

26. In an agricultural implement, the combination with a frame, of plow-beams carried by the frame and arranged in side gangs and an intermediate center gang, means for raising and lowering the rear ends of all of the plow-beams and the front ends of the center gang, and means for moving the front ends of the center gang of beams laterally in a horizontal plane.

27. In an agricultural implement, the combination with a frame, of plow-beams carried by the frame and arranged in side gangs and an intermediate center gang, means for raising and lowering the rear ends of all of the plow-beams and the front ends of the center gang, springs disposed to urge the front ends of the center gang of beams laterally in a horizontal plane, and means for urging said beams in opposition to the springs.

28. In a convertible agricultural implement, the combination with a frame, comprising side portions in laterally-spaced relation, a superstructure connecting said side portions, said superstructure comprising a vertically-adjustable arch, side gangs of plow-beams mounted in the side portions of the frame, a center gang of plow-beams removably mounted intermediate of said side portions of the frame, and means for supporting the rear ends of the several plow-beams.

29. In an agricultural implement, the combination with the frame, of a series of plow-beams, means for urging the front ends of the beams laterally in a horizontal plane, and means for raising and lowering the rear ends of the beams.

In testimony that I claim the foregoing as my own I have hereto affixed my signature in the presence of two witnesses.

CURTIS TRUBERRY HINES.

Witnesses:
C. H. CALHOUN,
S. H. TARBUTTON.